(12) United States Patent
Chatterjee et al.

(10) Patent No.: US 11,308,213 B2
(45) Date of Patent: Apr. 19, 2022

(54) DYNAMIC GENERATION OF AUTOMATION TAGS

(71) Applicant: SAP SE, Walldorf (DE)

(72) Inventors: Snigdhaman Chatterjee, Burdwan (IN); Hemanth Rajeswari Anantha, Bangalore (IN); Shivaprasad KC, Bangalore (IN); Debashis Banerjee, Bengaluru (IN)

(73) Assignee: SAP SE, Walldorf (DE)

( * ) Notice: Subject to any disclaimer, the term of this patent is extended or adjusted under 35 U.S.C. 154(b) by 215 days.

(21) Appl. No.: 16/887,639

(22) Filed: May 29, 2020

(65) Prior Publication Data
US 2021/0319106 A1    Oct. 14, 2021

(30) Foreign Application Priority Data

Apr. 14, 2020  (IN) .............................. 202011016043

(51) Int. Cl.
   *G06F 21/56*   (2013.01)
   *H04L 67/02*   (2022.01)
   (Continued)

(52) U.S. Cl.
   CPC ....... *G06F 21/566* (2013.01); *G05B 19/0426* (2013.01); *G06F 8/71* (2013.01); *G06F 8/75* (2013.01); *H04L 67/02* (2013.01)

(58) Field of Classification Search
   CPC ....... H04L 67/02; G05B 19/0426; G06F 8/70; G06F 8/71; G06F 8/75; G06F 9/45512;
   (Continued)

(56) References Cited

U.S. PATENT DOCUMENTS

| 7,934,201 B2 * | 4/2011 | Sweis ................ G06F 11/3692 |
| | | 717/124 |
| 10,489,286 B2 * | 11/2019 | Miller .................. G06F 16/958 |
| 2021/0081309 A1 * | 3/2021 | Golubev ............ G06F 11/3692 |

FOREIGN PATENT DOCUMENTS

| EP | 3132353 A1 * | 2/2017 | .......... G06F 11/3676 |
| WO | WO-2020072701 A1 * | 4/2020 | ............ G06F 11/079 |
| WO | WO-2021074922 A1 * | 4/2021 | |

OTHER PUBLICATIONS

Antonelli, Humberto Lidio et al. "Challenges of automatically evaluating rich internet applications accessibility." Proceedings of the 37th ACM International Conference on the Design of Communication: 6 pgs. (Year: 2019).*

(Continued)

*Primary Examiner* — John M MacIlwinen
(74) *Attorney, Agent, or Firm* — Schwegman Lundberg & Woesser, P.A.

(57) ABSTRACT

Systems and methods are provided for analyzing an HTML file to identify elements in the HTML file to which to add unique automation tags, and for each element identified, determining whether the element is a dynamic element. If the system determines that an element is a dynamic element, the system generates an observer for the dynamic element to detect a change to the dynamic element, and if the system detects a signal sent by the observer indicating that a change to the dynamic element has occurred, the system generates a unique automation tag for an element corresponding to the change to the dynamic element. If the system determines that the element is not a dynamic element, the system generates a unique automation tag for the element.

20 Claims, 7 Drawing Sheets

(51) Int. Cl.
 *G05B 19/042* (2006.01)
 *G06F 8/71* (2018.01)
 *G06F 8/75* (2018.01)
(58) Field of Classification Search
 CPC ............ G06F 11/3684; G06F 11/3696; G06F 21/566
 See application file for complete search history.

(56) References Cited

OTHER PUBLICATIONS

Watanabe, Willian Massami and Renata Fortes. "Automatic identification of drop-down menu widgets using mutation observers and visibility changes." Proceedings of the 31st Annual ACM Symposium on Applied Computing: 6 pgs. (Year: 2016).*

Dhamija, Ramit. "How WebdriverIO Uses Selenium Locators in a Unique Way—A WebdriverIO Tutorial With Examples", https://www.javacodegeeks.com/2020/02/how-webdriverio-uses-selenium-locators-in-a-unique-way-a-webdriverio-tutorial-with-examples.html. 13 pgs. Feb. 2020.*

Devbecca. "Listening for Changes in the DOM (Attributes, Nodes, Content Etc) Using the Mutation Observer in JavaScript", https://becca9941.github.io/web-developmenVcode-snippets/2019/07 /18/listen-for-changes-to-dom-attributes-nodes-content-with-mutation-observer.html. 3 pgs. (Year: 2019).*

Babib, Shuvo. "Listening to DOM changes by Javascript Web API, Mutation Observer (hint: It's the best practice)" https://shuvohabib.medium.com/listening-to-dom-changes-by-javascript-web-api-mutation-observer-hint-its-the-best-practice-3ee92dc8aac6. 8 pgs. (Year: 2018).*

Ranjit, Preethi. "How to Use MutationObserver API for DOM Node Changes", https://www.hongkiat.com/blog/mutationobserver-api/. 7 pgs. (Year: 2016).*

* cited by examiner

```
 Elements  Console  Sources  Network  Performance  Memory  Application  Security  Audits  AdBlock        ⊗25  ⚠2  ⋮  × style="max-height: 200px;">
  ┌─────────────────────┐
  │ <!--bindings={      │── 402
  │  "ng-reflect-ng-if": "true"
  │ }-->                │
  └─────────────────────┘
  ▶<ul class="ui-dropdown-items ui-dropdown-list ui-widget-content ui-widget ui-helper-reset ng-tns-
  c28-20 ng-star-inserted" awname="arcSharedDropdownCusEnumTestDisplayDivDropdown3Div1Div14Div3Ul1" style>
     ┌─────────────────────┐
     │ <!--bindings={       │── 404
     │  "ng-reflect-ng-for-of": "[object Object], [object Object]"
     │ }-->                 │
     └─────────────────────┘
     ▲<li class="ng-tns-c28-20 ui-dropdown-item ui-corner-all ui-state-highlight ng-reflect-ng-
     class="[object Object]" awname="arcSharedDropdownCusEnumTestDisplayDivDropdown3Div1Div14Div3Ul1Li2">...</li>
     ▲<li class="ng-tns-c28-20 ui-dropdown-item ui-corner-all ng-star-inserted" ng-reflect-ng-class="" [object Object]
     " awname="arcSharedDropdownCusEnumTestDisplayDivDropdown3Div1Div14Div3Ul1Li3">...</li>
  ┌──────────────────────────────────────────────────────────────────────────────────────────┐
  │  ▲<li class="ng-tns-c28-20 ui-dropdown-item ui-corner-all ng-star-inserted" ng-reflect-ng-class="" [object Object]  │── 406
  │  " awname="arcSharedDropdownCusEnumTestDisplayDivDropdown3Div1Div14Div3Ul1Li4"> == $0    │
  │  ▲<li class="ng-tns-c28-20 ui-dropdown-item ui-corner-all ng-star-inserted" ng-reflect-ng-class="" [object Object]  │
  │  " awname="arcSharedDropdownCusEnumTestDisplayDivDropdown3Div1Div14Div3Ul1Li5">...</li>   │
  └──────────────────────────────────────────────────────────────────────────────────────────┘
    </ul>
   </div>
  </div>
  ::after
```

FIG. 4A

```
</div>
</p-dropdown>
</div>
<!--bindings={
  "ng-reflect-ng-if": "true"
}-->
</arc-shared-dropdown>
</div>
</div>
▲<a-error-messages _ngcontent-c5 _nghost-c31 ng-reflect-control="[object Object]" awname=
"customFieldDisplayDivAwFormTable1FormDiv1Div1AwRight6Div4Div2AwFormRow1Div1Div4AErrorMessages7"> </a-error-message>
</div>
::after
</div>
</aw-form-row>
</div>
</div>
▲<div _ngcontent-c12 ng-reflect-ng-class=" [object Object]" class=" ng-star-inserted" awname=
"customFieldDisplayDivAwFormTable1FormDiv1Div1AwRight6Div5"> </div>
</aw-right>
::after
```

DYNAMIC GENERATION OF AUTOMATION TAGS

BACKGROUND

Developers of applications (e.g., for Android, iOS, etc.) often use one or more third-party tools to develop some functionality of each application being developed. For example, developers may use third-party open source packages that offer particular functionality desired in the application. Since the source code for these packages is abstracted, it is challenging to write automation scripts for testing the application since the underlying elements of the components inside the packages are not accessible.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to dynamic generation of automation tags for quality assurance. As explained above, developers often use third-party open source packages that offer particular functionality desired in the application. Since the source code for these packages is abstracted, it is challenging to write automation scripts for testing the application since the underlying elements of the components inside the packages are not accessible. For instance, a unique identifier (e.g., unique automation tag) on elements of the source code is needed to achieve complete automation of an application using third-party components. Since the source code for the third-party components is not accessible, adding automation tags to the underlying elements of the third-party components is not possible through modification of the source code.

For example, a developer may use a platform or front-end framework, such as Angular, to develop applications (e.g., mobile and desktop web applications). A unique automation tag is needed on HTML Document Object Model (DOM) elements (e.g., user interface (UI) buttons, input boxes, calendar components, etc.) to achieve complete automation of the applications using Angular. Achieving UI scripts for testing is not possible without automation tags, and currently there is no mechanism to add such automation tags on third-party components or dynamic HTML elements that are rendered on demand based on asynchronous server calls.

For instance, there are various UI components that depend on data received asynchronously from a server to render. Some examples of these UI components include dropdown menu items, filters, and the like. Quality assurance will want to test each and every option inside of these UI components, and to do so, each option needs to have a unique automation tag that is consistent during multiple reloads. Simply generating unique automation tags is not sufficient, since a unique automation tag has to be the same for each element all the time or else automation scripts will not work as intended.

Also, the solution has to be completely dynamic and handle any elements. For example, consider a dropdown box in a UI that displays a geographical region. The automation tag for USA should be unique from any other elements inside the entire application context currently being rendered on screen. This is to prevent clashes so that the automation framework can identify the exact component and not confuse it with another element. Further, the automation tag should be the same no matter how many times the UI (e.g., page) is reloaded, or if the page is loaded now or at a later time (e.g., 10 days later).

There is no framework that currently generates automation tags automatically for elements (e.g., HTML, elements) inside third-party components and handles rendering of data. For instance, the AribaUI package provides a directive that adds an automation tag, but only to the element to which it is added in the code and does not handle dynamic data. AribaUI is simply a compile time solution and does not add an automation tag to the underlying elements (or children) or handle asynchronous data from the server dynamically. Using the aforementioned example of a geographical region dropdown box in a UI, the AribaUI directive adds a static automation tag only to the root dropdown elements, and not to any of the actual selectable entries inside the dropdown component, or any button or interactive elements inside the dropdown component. Thus, an automation tag added by this directive is not usable and it is not possible for a quality assurance team to rely on this basic directive to achieve one hundred percent automation.

Example embodiments address these and other issues by providing a framework that dynamically generates unique automation tags for "children" components of any third-party components (e.g., AribaUI components). This new framework provides a component-level solution (e.g., versus an Angular directive as used in AribaUI) to apply unique automation tags on all third-party components. The framework also works for dynamic elements such as dropdowns or hierarchy choosers whose values are dependent on asynchronous server calls. The framework is very lightweight and straightforward to implement into existing applications (e.g., Angular applications).

Figure 1:
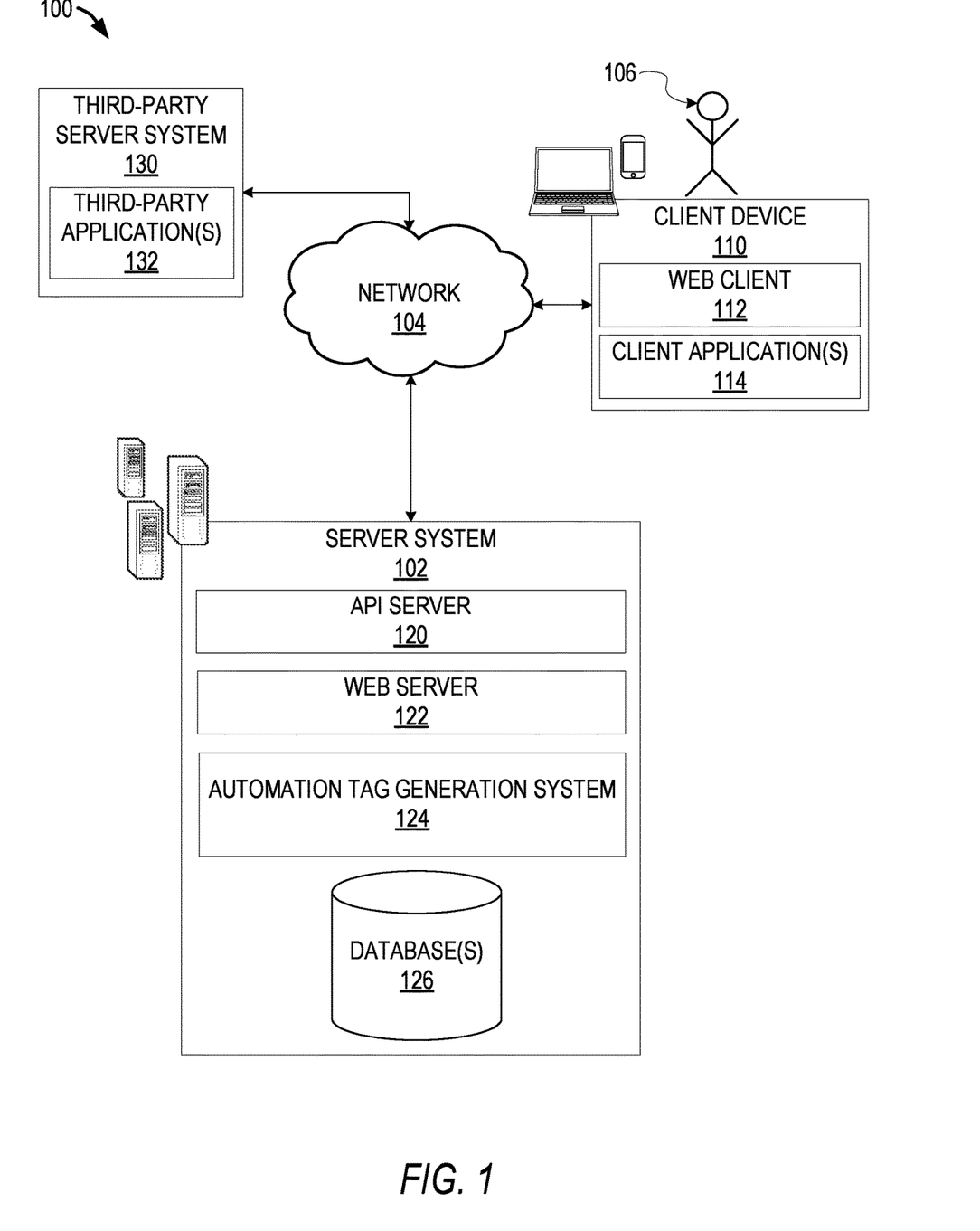
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other computing or communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party server system 130, server system 102) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110. In one example, the user is a developer of one or more applications (e.g., mobile and desktop web applications) or a quality assurance engineer.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, a sales order creation application, an automation tag generation application, and the like.

In some embodiments, one or more client applications 114 may be included in a given client device 110, and configured to locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access software version information, access an ERP system, access a CRM system, access machine learning models, access an automation tag generation, to authenticate a user 106, to verify a method of payment, access test data, and so forth). Conversely, one or more applications 114 may not be included in the client device 110, and then the client device 110 may use its web browser to access the one or more applications hosted on other entities in the system 100 (e.g., third-party server system 130, server system 102).

A server system 102 may provide server-side functionality via the network 104 (e.g., the Internet or wide area network (WAN)) to one or more third-party server system 130 and/or one or more client devices 110. The server system 102 may include an application program interface (API) server 120, a web server 122, and an automation tag generation system 124 that may be communicatively coupled with one or more databases 126.

The one or more databases 126 may be storage devices that store data related to users of the system 100, applications associated with the system 100, cloud services, machine learning models, and so forth. The one or more databases 126 may further store information related to third-party server system 130, third-party applications 132, client devices 110, client applications 114, users 106, and so forth. In one example, the one or more databases 126 is cloud-based storage.

The server system 102 may be a cloud computing environment, according to some example embodiments. The server system 102, and any servers associated with the server system 102, may be associated with a cloud-based application, in one example embodiment.

The automation tag generation system 124 may provide back-end support for third-party applications 132 and client applications 114, which may include cloud-based applications. The automation tag generation system 124 may provide for generation of automation tags for quality assurance, as described in further detail below. The automation tag generation system 124 may comprise one or more servers or other computing devices or systems.

The system 100 further includes one or more third-party server system 130. The one or more third-party server system 130 may include one or more third-party application(s). The one or more third-party application(s) 132, executing on third-party server(s) 130, may interact with the server system 102 via API server 120 via a programmatic interface provided by the API server 120. For example, one or more of the third-party applications 132 may request and utilize information from the server system 102 via the API server 120 to support one or more features or functions on a website hosted by the third party or an application hosted by the third party.

The third-party website or application 132, for example, may provide access to functionality and data supported by third-party server system 130. In one example embodiment, the third-party website or application 132 may provide access to functionality that is supported by relevant functionality and data in the third-party server system 130. In one example, a third-party server system 130 is a system associated with an entity that accesses cloud services via server system 102.

Figure 2:
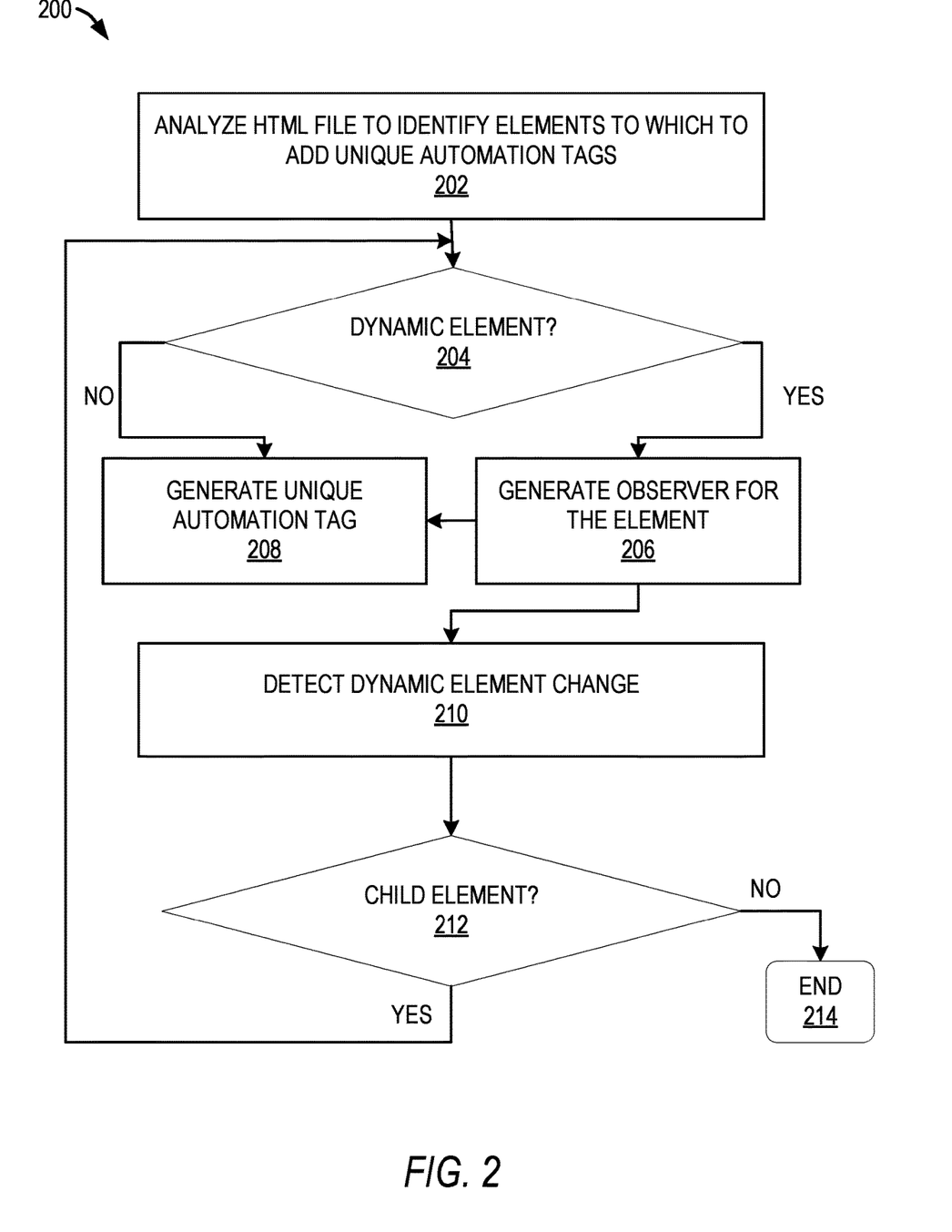
FIG. 2 is a flow chart illustrating aspects of a method for generating automation tags, according to some example embodiments.

FIG. 2 is a flow chart illustrating aspects of a method 200 for generating automation tags, according to some example embodiments. For illustrative purposes, method 200 is described with respect to the block diagram of FIG. 1. It is to be understood that method 200 may be practiced with other system configurations in other embodiments.

In operation 202, a computing system analyzes a file in a structured markup language, such as an HTML file, to identify elements in the HTML file to which to add unique automation tags. In one example, the computing system is a server or server system, such as server system 102, automation tag generation system 124, or third-party server system 130. In another example, the computing system is a client device, such as client device 110. As explained above, a unique automation tag is the same for a particular element all the time for automation scripts to work as intended. Moreover, the automation tag for a particular element is unique from any other elements inside the entire application context currently being rendered on screen. This is to prevent clashes so that the automation framework can identify the exact component and not confuse it with another element. Further, the unique automation tag should be the same no matter how many times the UI (e.g., page) is reloaded, or if the page is loaded now or at a later time (e.g., 10 days later).

To identify elements in the HTML file, the computing system searches or parses the HTML file for an HTML element of a component where a unique automation tag is desired. As an example, example embodiments work with HTML and javascript as primary languages that a web browser understands. It is to be understood that example embodiments can be used with other languages. One example embodiment comprises a javascript code to parse the HTML template, generate dynamic tags, and add them back to the HTML as attributes. In one example embodiment, the implementation is for an Angular application and the javascript code is written in typescript (e.g., a superset language of javascript).

For example, an Angular component is a combination of an HTML template and its corresponding javascript (e.g., written in typescript) code. For awname generation, this component is declared as an object of type ElementRef and this object represents the entire component (also referred to herein as a "hostElement"). Examples of a component or hostElement include a dropdown menu, a search field, a button, and so forth (e.g., a component that is interactable or that will be displayed (e.g., a message)). An Angular component can include an HTML file (e.g., which has the template) and a type-script file where behaviors are defined. A unique automation tag refers to a parameter that is generated and added to an HTML element where the unique automation tag is needed. Example embodiments also dynamically add unique automation tags to children elements of a parent element, as explained below. This framework observes for changes (or mutations) in the element's children.

For each element identified, the computing system determines whether the element is a dynamic element, in operation 204. In one example embodiment, to determine if the element is a dynamic element, the computing system parses the HTML file to detect "if" and "for" conditions. For example, in an Angular application, the computing system determines whether the element comprises an "ng-if" or an "ng-for" indicating an if or for condition.

Figure 3:
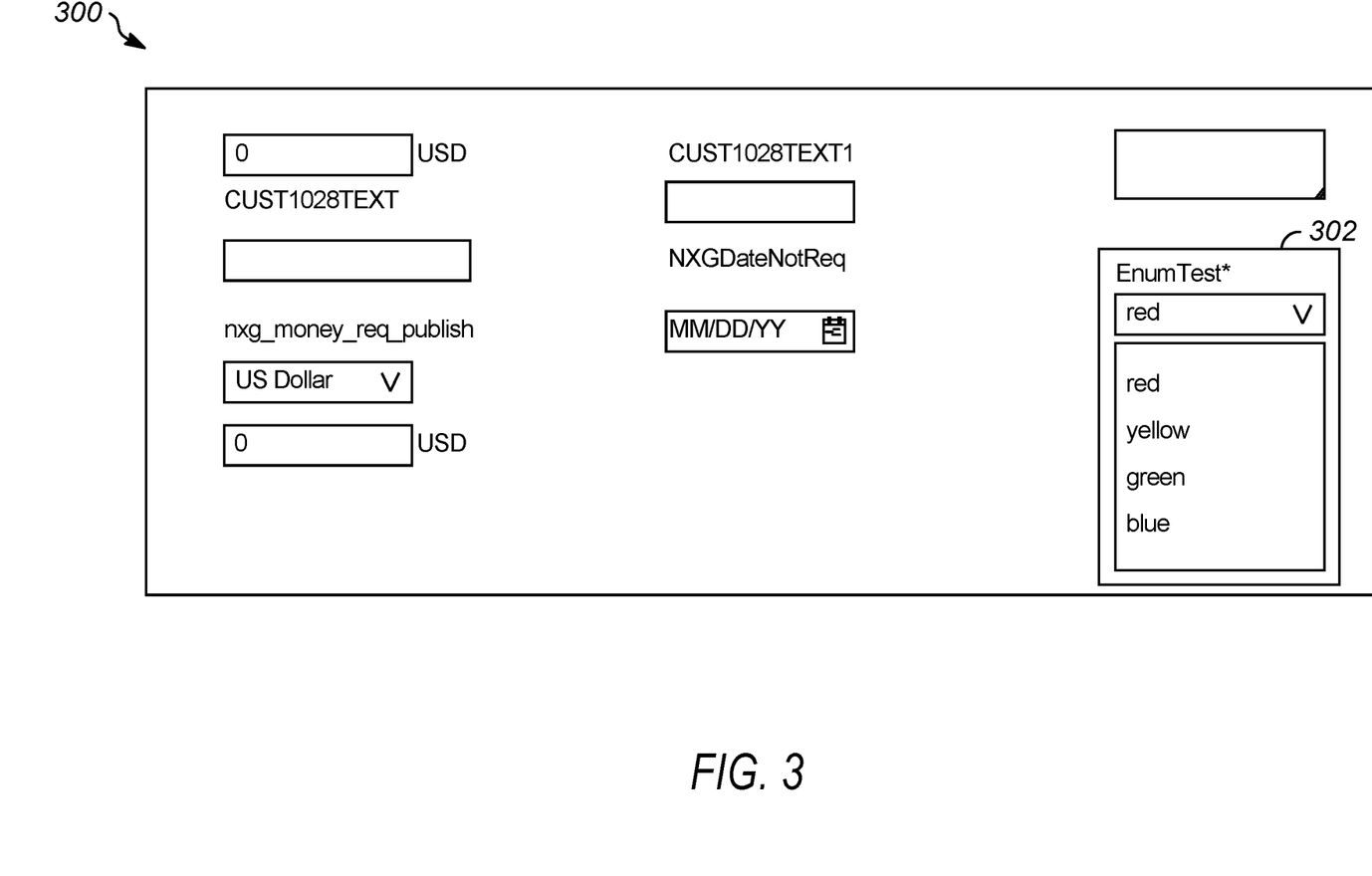
FIG. 3 illustrates an example user interface, according to some example embodiments.

FIG. 3 illustrates an example UI 300 for an Angular application. One component of the example UI 300 is a dropdown UI component 302 that allows a user to choose one of four colors (red, yellow, green, blue). The dropdown UI component 302 in this example is an arcSharedDropdown component which is a third-party component. A developer can only add a unique automation tag at the root element of this component and not the individual elements inside the component. However, a unique automation tag is needed for each and every interactive element inside this third-party dropdown (e.g., buttons, options, etc.).

Figure 4A:
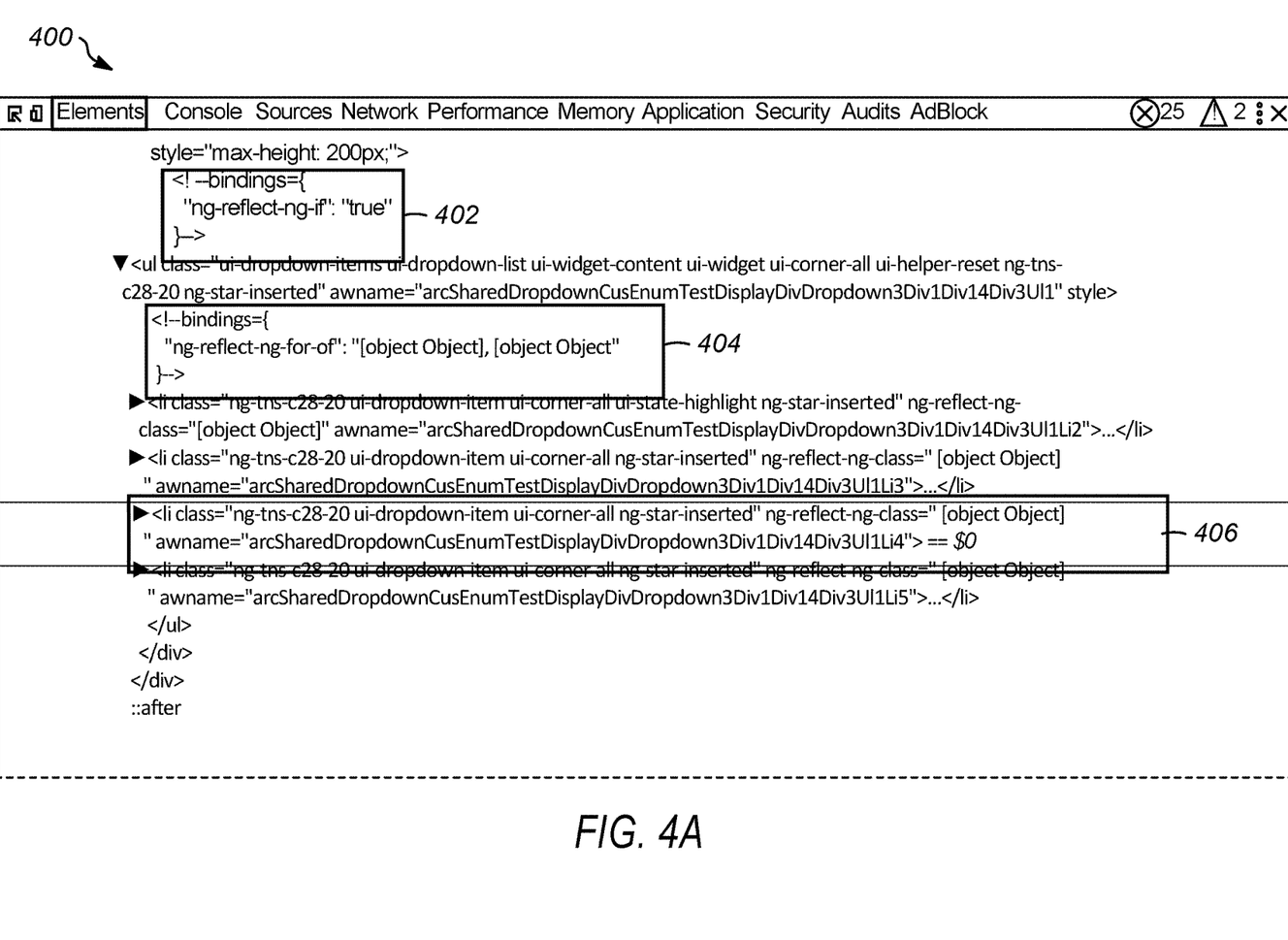
FIGS. 4A and 4B illustrate an HTML file with example automation tags, according to some example embodiment.
Figure 4B:
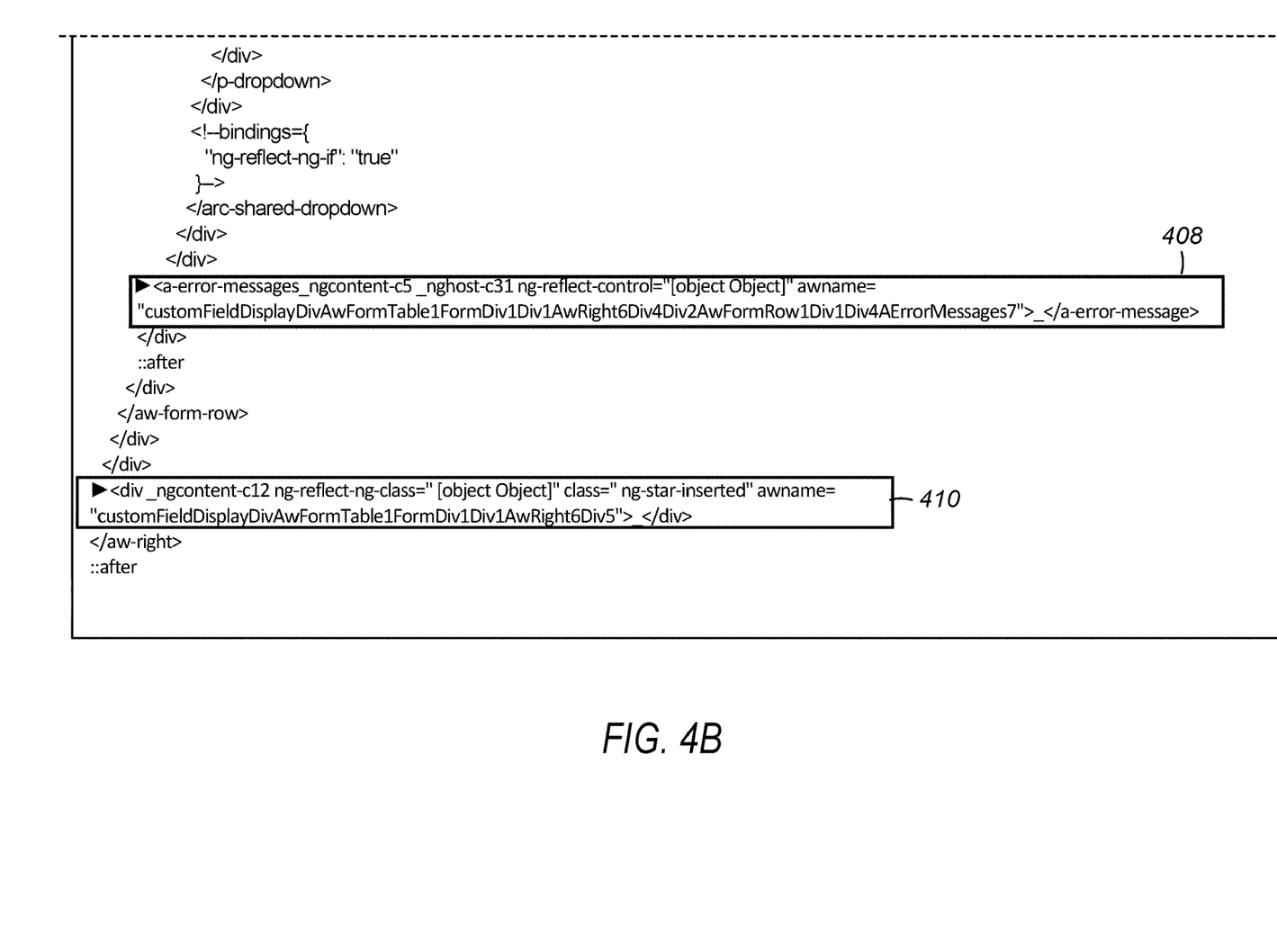

FIGS. 4A and 4B illustrate and example HTML file 400 (shown on two pages for readability) corresponding to the dropdown UI component 302 and an example of how a dynamic unique automation tag is generated for the dropdown selection "green." In the example HTML file 400, an ng-if condition is shown in line 402. Angular introduces this ng-binding with ng-if during runtime. This will be used to generate an observer (e.g., a MutationObserver) for this ng-if condition to observe changes in children, as explained below. An ng-for condition is shown in line 404 of the HTML file 400. An observer will also be created for this ng-for condition. Further details corresponding to FIGS. 4A and 4B are described below.

Returning to FIG. 2, based on determining that the element is not a dynamic element (e.g., NO for operation 204), the computing system generates a unique automation tag for the element, in operation 208. In one example, the computing system determines if the element has a unique automation tag for the element, and if so, assigns the given unique automation tag to the element. If the element does not have a unique automation tag, the computing system determines if a parent of the element has a unique automation tag. If so, the computing system takes the parent unique automation tag as a base and creates a unique automation tag for the element based on a DOM tree structure. If the element does not have a unique automation tag or a parent element with a unique automation tag, the computing system determines the type of the element and uses the type of the element as a base to generate the unique automation tag. This is just one example of how a unique automation tag is generated. It is to be understood that a unique automation tag can be generated by other means or methods in example embodiments.

Lines 406, 408 and 410 shown in FIGS. 4A and 4B show examples of unique automation tags for an element indicated by "awname" and followed by the unique automation tag (e.g., unique awname in this example). For instance, the unique automation tag or awname in line 406 is arcShareDropdownCusEnumTestDisplaydivPDropdown3 Div1 Div14 Div3Ul1li4. In this example, the awname corresponds to a dynamic element, but it is to be understood that an awname for an element that is not dynamic can be similarly generated. In one example embodiment, the unique automation tag (or awname) is generated as follows:

If any element has an awname provided to it through HTML, the computing system will add that particular awname to that element.

If any element does not have any awname, the computing system will take the awname of the parent element closest to it in hierarchy and generate a unique awname after that.

If the element does not have any parent with an awname in its hierarchy, the computing system constructs a unique awname using the DOM hierarchy of the component.

Based on determining the element is a dynamic element (e.g., YES for operation 204), the computing system generates an observer for the element to detect a change to the dynamic element, in operation 206. In one example the observer is a MutationObserver which will invoke a specified callback function when DOM changes occur. In this example, the MutationObserver is a JavaScript object that observes any changes (e.g., a change in state) and sends an alert or notification of the change or that the change has occurred.

In operation 210, the computing system determines whether a change has occurred to the dynamic element. For example, the computing system can detect a signal (e.g., alert or notification) sent by the observer for the dynamic element, indicating that a change to the dynamic element has occurred. If a change has occurred, the computing system generates a unique automation tag for an element corresponding to the change to the dynamic element.

For example, the computing system determines whether the dynamic element has any children, in operation 212. If the computing system determines that the dynamic element has a child element (e.g., YES at operation 212), the computing system returns to operation 204 and proceeds as explained above to generate a unique automation tag for the child element. The computing system does this for each child element detected for the dynamic element. If there is no child element or no further child elements, the process ends at operation 214 (until a next change is detected to a dynamic element or further elements are identified).

Lines 406, 408 and 410 in FIGS. 4A and 4B show examples of unique automation tags for an element indicated by "awname" and followed by the unique automation tag (e.g., unique awname in this example). For instance, the unique automation tag or awname in line 406 is arcShareDropdownCusEnumTestDisplaydivPDropdown3 Div1 Div14 Div3Ul1li4. This is the dynamic unique automation tag (e.g., awname) generated for the selection "green" in the dropdown UI component 302 (e.g., dropdown box) shown in example UI 300 of FIG. 3. As mentioned above, the options in this dropdown are dynamic and depend on data from the server that is not available during initialization of the page. Here, the element type is arSharedDropdown, which is a third-party component. The generated awname is unique and will always be the same for this element no matter how many times the page is reloaded. In this, the awname of the parent is CusEnumTestDisplay and the element type is arcSharedDropdown. The remaining part of the identifier is generated dynamically by traversing the tree structure of arcSHaredDropdown element and observing for changes (e.g., mutations). As explained above, this is just one example of how a unique automation tag is generated. It is to be understood that a unique automation tag can be generated by other means or methods in example embodiments.

After generating a unique automation tag for an element or dynamic element, the unique automation tag is added to the HTML, file as shown in FIGS. 4A and 4B and described above. In one example embodiment, the elements, including the dynamic elements (and observers), are identified during an initialization phase of the UI component (which is a combination of the HTML template and its corresponding javascript code). In one example embodiment, the signal sent by the observer is sent and detected during runtime of the HTML file.

The generated unique automation tags can then be used to generate a test automation script, using the generated unique automation tags. For example, a quality assurance engineer can generate a test automation script (e.g., a set of instructions) to be performed by a computing system under test to verify that a system performs as expected. One example of a UI automation code to simulate a click action of supplier search radio button using awname is as follows:

```
supplierXpath = String.format('//*[@awname =
\'supplierSearchResultsAwRadiobutton%sSpanPRadiobutton3Div1Div3\']',
GlobalVariable.supplierName)
    supplierNameAwname = new TestObject('dynamicTestObject')
    supplierNameAwname.addProperty('xpath', ConditionType.EQUALS,
supplierXpath)
    CustomKeywords,'common.util.aribakeywords.aribaClick'(supplierNameAw
name)
```

Example pseudo code for performing the operations of FIG. 2 is shown next. The first step in the processing is to determine if the functionality for generating unique automation tags is enabled (e.g., isEnabled is a Boolean flag to determine if dynamic automation tags generation is to be used in the current deployed environment). As described above, the output of the process is unique and consistent automation tags added to all elements (and any children of elements) in the HTML, file. The example below is in an Angular application scenario and awname is used below to refer to the unique automation tag.

```
Step 1: - if isEnabled = false
            return false //Dynamic AWName generation is turned off for this
                    //environment.
        else
Step 2: - For each element in hostElement:
            If element has "ng-if" or "ng-for"
                Create MutationObserver for element.//Observe for
                        //dynamic elements inside the element.
                If any change is detected by MutationObserver, go to
                    Step 3
            If element has awName parameter in HTML
                Assign given awName to element.
            Else if parent of element has awName attribute
                Take parent awName as base and create unique
                awName for element based on DOM tree structure
                //Parent will always have awName parameter since
                //we are using recursion to get child elements in Step 3
            Else
                Get HTMLElement type of the element and use it as a
            base to generate AWName.
Step 3: - If element has children
                Set element := element.children
                Go to step 2.
```

Example embodiments provide for a completely runtime and fully dynamic solution, as explained above. Further, example embodiments provide a framework that generates unique and consistent unique automation tags for elements. Uniqueness ensures that automation scripts for testing record only the element that quality assurance wants to record. Consistency ensures that the automation scripts can be replayed without throwing errors. For example, in the case of a UI dropdown to select a geographical region parameter, the dropdown has multiple selectable options for which data is fetched dynamically from a server after the component is initialized (and hence, might be subject to change). For example, there may be a selectable option called USA being returned by the server. Then, the automation tag generated for the option USA should be unique from any other element currently rendered by the application. Also, the unique automation tag should be the same during subsequent re-runs for automation scripts to actually work. If the unique automation tag for the element is "dropdown-region-usa" (for example), then there should not be another element called "dropdown-region-usa" currently being rendered by the application. Also, the name "dropdown-region-usa" should be dynamically generated every time, no matter if there are ten options in the dropdown or one-hundred options.

The framework is further capable of applying unique automation tags to children components of any other component (e.g., Angular component) whose source code cannot be accessed by developers or quality assurance. This typically involves open source third-party packages as well as other packages developed by other teams within a development team. This is done by traversing the DOM of the HTML element using Depth First Search (DFS) and adding a unique automation tag to the element.

Moreover, the framework can handle elements that are rendered dynamically later at some point in the component lifecycle, and not just during component initialization and load. The framework does this by hooking into the inner workings of, for example, the Angular framework and creating JavaScript MutationObserver objects whenever it sees <ng-if> or <ng-for> comment tags added by angular framework inside the DOM (e.g., Angular adds these comments to the DOM during run time). In this way, example embodiments leverage the way a development platform, such as Angular, works to identify which are the elements that are subject to change when the application is rendered on screen. When the framework observes a change inside a MutationObserver object, the unique automation tag generation logic is run on the element to add unique automation tags to the children elements of the dynamic element.

Also, the framework can handle elements that render on-demand data which comes asynchronously from the server. Example embodiments use the same properties of a development platform mentioned in the previous passage to achieve this.

The framework has high performance as it intelligently adds observers (e.g., MutationObservers) only to the elements which need to be observed for change and does not greedily add an observer for each and every element. The framework is toggle-able and can be switched off for environments and services were automation is not needed. For example, automation tag generation is not needed in production environments and thus can be switched off easily through a parameter.

The framework is easy to implement. For example, only a few lines of code are needed in a component that desires dynamic automation tag generation. Thus, support for dynamic AWName generation for an entire angular application can be achieved within a couple of days (if not earlier) and requires very little effort on the part of developers.

In one specific example embodiment, the framework includes a util class AWNameUtils. In this example, AWName is used interchangeably with a unique automation tag. If any component needs AWName generation on dynamic values or base HTML elements in third-party components (basically any HTML element in wrapper components like aw-input, aw-chooser, etc.), they either directly or indirectly extend NXGBaseComponent. This is the base component designed for Contracts NXG microservice and already includes some base-level functionalities. This is a super class that is already inherited by several lower level base classes such as ContractsSrcPageComponent. Once NXGBaseComponent is present in the hierarchy of a component, the component needs to implement the AfterViewInit interface and invoke the awName generating method of the superclass by passing the hostElement reference of the component.

A custom HTML attribute called "awName" can be added to an HTML element where dynamic AWName generation is needed. An external parameter called "ext" can be passed, which will form as the base of the AWName. If no ext parameter is passed, then the framework takes the type of the HTML element as the base for the AWName.

If the element does not have an AWName passed to it through HTML, the framework will look for the nearest parent that has AWName and build a dynamic yet unique AWName for this element. This is how the computing system generates AWNames for children elements of third-party components, as explained in further detail above.

The following snippets are examples of what is added to a component where dynamic automation tag generation is desired. The first snippet is for the NXGBaseComponent code, as explained above:

```
NXGBaseComponent code:
generateAwName (hostElement: any)
{
    AWNameUtils.generateAwName(hostElement);
}
```
            The next snippet is for an HTML-side addition of AWNames, which can be the same as that of the AribaUI directive level solution:
```
<arc-typeahead-chip [field]="'name'" [dataSource]="ownerDatasource"
            [(ngModel)]="owners"
            [identifierName]="owners"
            (onSelect)="onUserSelectorFocusOut( )"
            i18n-placeHolder="Placeholder Owner | placeholder with
text as Owner @@arp-contracts-search.component_Owners_Placeholder"
            placeholder="Owner"
            awName ext="arp-contracts-search-
            component_Owners"> //This is how we add AWName tags
                //to elements
</arc-typeahead-chip>
```

In the above snippet, <arc-typeahead-chip> is a third-party Angular component whose source code is not available for modification. The framework will intelligently traverse the tree structure of this HTML element object and add AWNames to its children elements. It will also add MutationObservers for elements that it detects to be dynamic.

The next example is for Typescript code of a component where dynamic AWName generation is desired. Only the bold piece of code is the change needed for dynamic AWName generation inside a component:

```
export class ARPViewCwComponent extends NXGBaseComponent implements
OnDestroy, AfterViewInit
{
    constructor (...
    private hostElement : ElementRef)
    ngAfterViewInit ( )
    {
        super.generateAwName(this.hostElement.nativeElement);
    }
}
```

In example embodiments, the framework handles multiple levels of hierarchy with respect to third-party packages. For example, AribaUI components can be built on top of an open source third-party package called PrimeNG. PrimeNG components have the actual HTML elements where AWNames need to be added. The framework can traverse this hierarchy of elements and add unique AWNames where needed.

The framework observes changes or mutations in a component (e.g., Angular component) and uses the observation to generation dynamic AWNames. This works for all components dependent on asynchronous responses as well as DOM manipulations such as calendar components, typeahead searches, hierarchy searches, and so forth. If any element has an AWName provided to it through HTML, it will add that particular AWName to that element. If any element does not have any AWName, it will take the AWName of the parent element closest to it in hierarchy and generate a unique AWName after that. If the element does not have any parent with AWName in its hierarchy, it constructs a unique AWName using the DOM hierarchy of the component.

Figure 5:
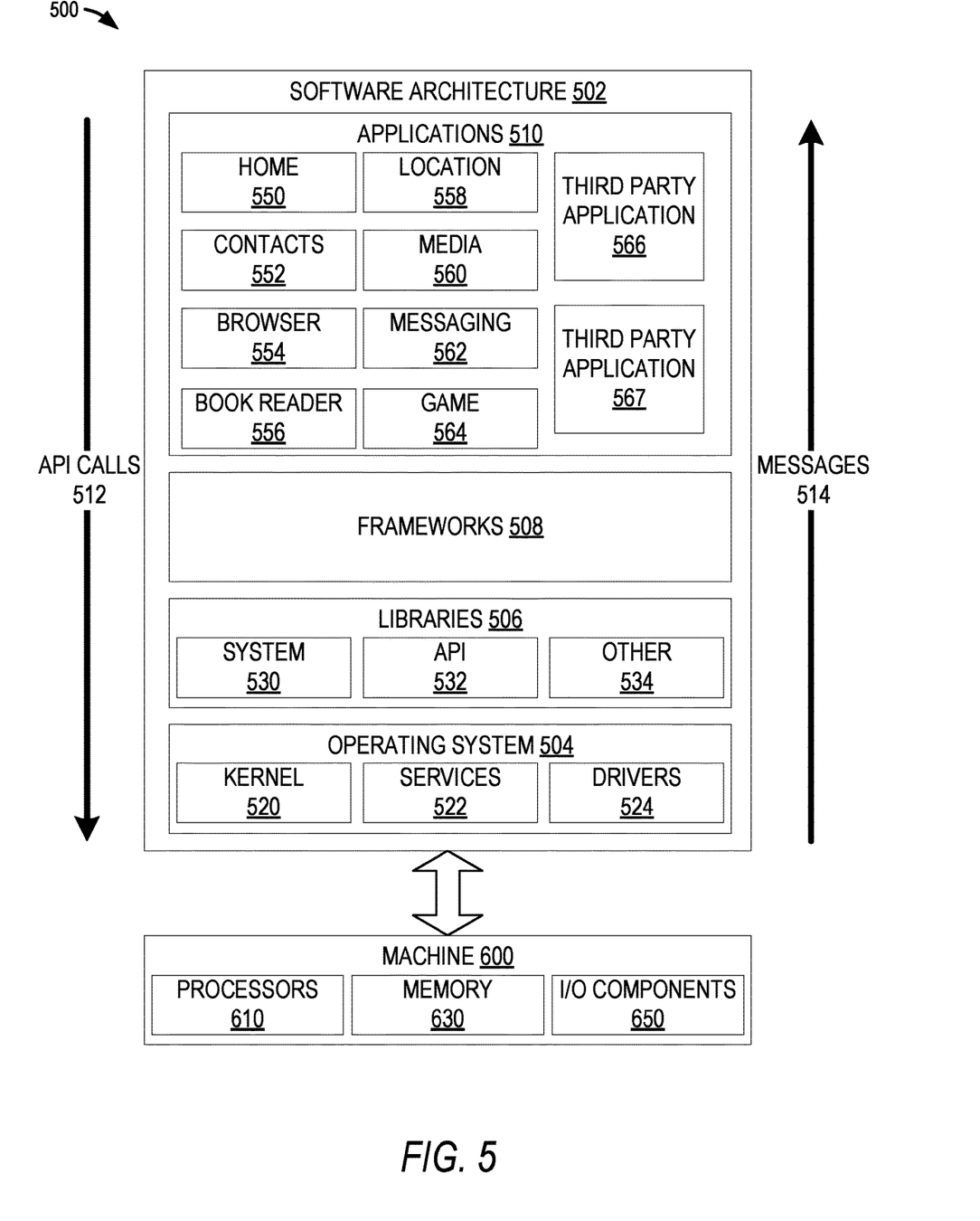
FIG. 5 is a block diagram illustrating an example of a software architecture that may be installed on a machine, according to some example embodiments.

FIG. 5 is a block diagram 500 illustrating software architecture 502, which can be installed on any one or more of the devices described above. For example, in various embodiments, client devices 110 and servers and systems 130, 102, 120, 122, and 124 may be implemented using some or all of the elements of software architecture 502. FIG. 5 is merely a non-limiting example of a software architecture, and it will be appreciated that many other architectures can be implemented to facilitate the functionality described herein. In various embodiments, the software architecture 502 is implemented by hardware such as machine 600 of FIG. 6 that includes processors 610, memory 630, and I/O components 650. In this example, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke application programming interface (API) calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphic user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications such as third-party applications 566 and 567. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
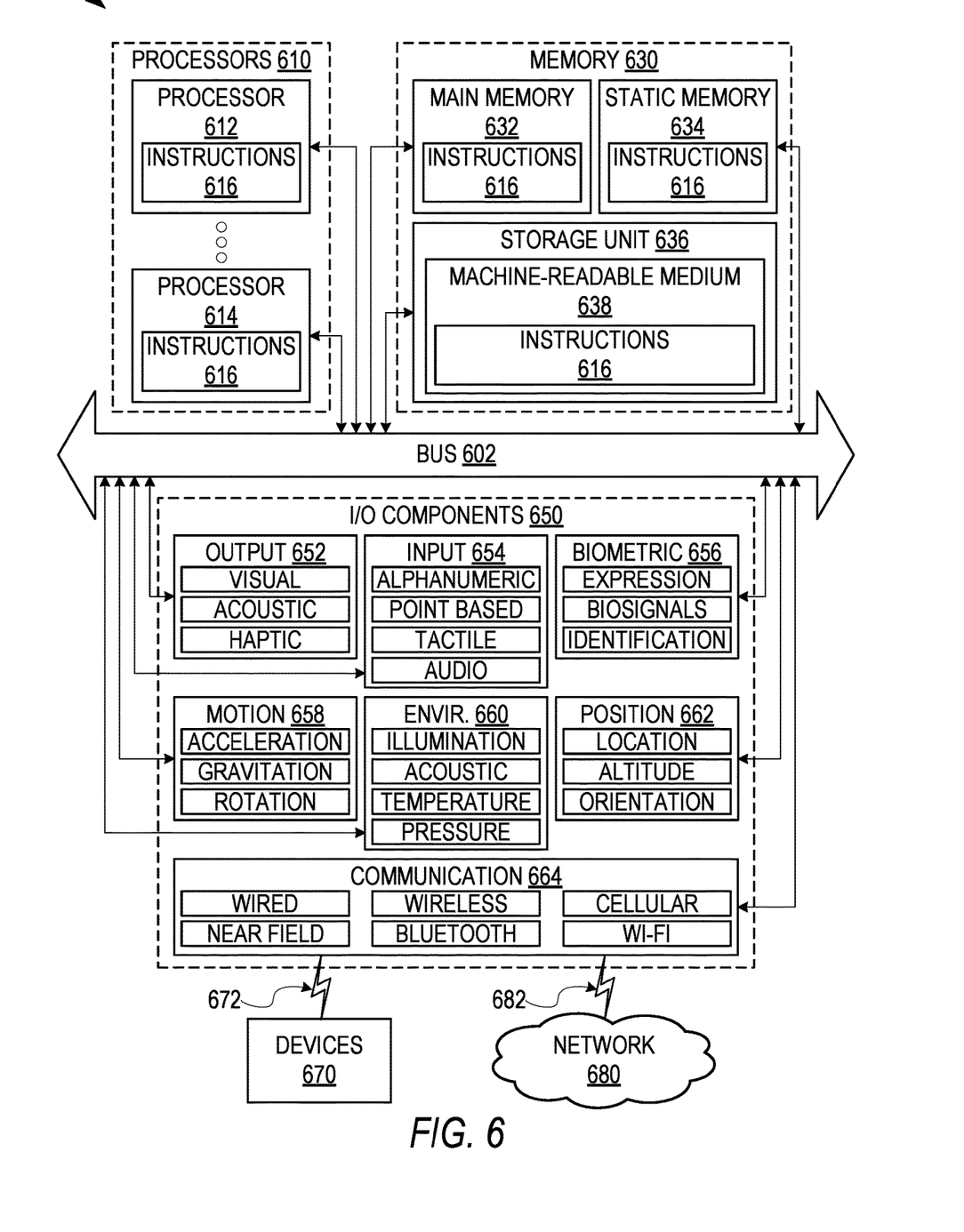
FIG. 6 illustrates a diagrammatic representation of a machine, in the form of a computer system, within which a set of instructions may be executed for causing the machine to perform any one or more of the methodologies discussed herein, according to an example embodiment.

FIG. 6 is a block diagram illustrating components of a machine 600, according to some embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application 510, an applet, an app, or other executable code) for causing the machine 600 to perform any one or more of the methodologies discussed herein can be executed. In alternative embodiments, the machine 600 operates as a standalone device or can be coupled (e.g., networked) to other machines. In a networked deployment, the machine 600 may operate in the capacity of a server machine or system 130, 102, 120, 122, 124, etc., or a client device 110 in a server-client network environment, or as a peer machine in a peer-to-peer (or distributed) network environment. The machine 600 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

In various embodiments, the machine 600 comprises processors 610, memory 630, and I/O components 650, which can be configured to communicate with each other via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 612 and a processor 614 that may execute the instructions 616. The term "processor" is intended to include multi-core processors 610 that may comprise two or more independent processors 612, 614 (also referred to as "cores") that can execute instructions 616 contemporaneously. Although FIG. 6 shows multiple processors 610, the machine 600 may include a single processor 610 with a single core, a single processor 610 with multiple cores (e.g., a multi-core processor 610), multiple processors 612, 614 with a single core, multiple processors 612, 614 with multiples cores, or any combination thereof.

The memory 630 comprises a main memory 632, a static memory 634, and a storage unit 636 accessible to the processors 610 via the bus 602, according to some embodiments. The storage unit 636 can include a machine-readable medium 638 on which are stored the instructions 616 embodying any one or more of the methodologies or functions described herein. The instructions 616 can also reside, completely or at least partially, within the main memory 632, within the static memory 634, within at least one of the processors 610 (e.g., within the processor's cache memory), or any suitable combination thereof, during execution thereof by the machine 600. Accordingly, in various embodiments, the main memory 632, the static memory 634, and the processors 610 are considered machine-readable media 638.

As used herein, the term "memory" refers to a machine-readable medium 638 able to store data temporarily or permanently and may be taken to include, but not be limited to, random-access memory (RAM), read-only memory (ROM), buffer memory, flash memory, and cache memory. While the machine-readable medium 638 is shown, in an example embodiment, to be a single medium, the term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions 616, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 650 include a wide variety of components to receive input, provide output, produce output, transmit information, exchange information, capture measurements, and so on. In general, it will be appreciated that the I/O components 650 can include many other components that are not shown in FIG. 6. The I/O components 650 are grouped according to functionality merely for simplifying the following discussion, and the grouping is in no way limiting. In various example embodiments, the I/O components 650 include output components 652 and input components 654. The output components 652 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 650 include biometric components 656, motion components 658, environmental components 660, or position components 662, among a wide array of other components. For example, the biometric components 656 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 include acceleration sensor components (e.g., accelerometer), gravitation sensor components, rotation sensor components (e.g., gyroscope), and so forth. The environmental components 660 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 662 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 include a network interface component or another suitable device to interface with the network 680. In further examples, communication components 664 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 670 may be another machine 600 or any of a wide variety of peripheral devices (e.g., a peripheral device coupled via a Universal Serial Bus (USB)).

Moreover, in some embodiments, the communication components 664 detect identifiers or include components operable to detect identifiers. For example, the communication components 664 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 664, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 616 are transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, in other example embodiments, the instructions 616 are transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Furthermore, the machine-readable medium 638 is non-transitory (in other words, not having any transitory signals) in that it does not embody a propagating signal. However, labeling the machine-readable medium 638 "non-transitory" should not be construed to mean that the medium is incapable of movement; the medium 638 should be considered as being transportable from one physical location to another. Additionally, since the machine-readable medium 638 is tangible, the medium 638 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
analyzing, by one or more hardware processors, an HTML file to identify elements in the HTML file to which to add unique automation tags;
for each element identified, determining whether the element is a dynamic element;
based on determining that the element is a dynamic element, performing operations comprising:
generating an observer for the dynamic element to detect a change to the dynamic element;
detecting a signal sent by the observer indicating that a change to the dynamic element has occurred; and
generating a unique automation tag for an element corresponding to the change to the dynamic element; and
based on determining that the element is not a dynamic element, generating a unique automation tag for the element.

2. The computer-implemented method of claim 1, wherein the dynamic element is identified by detecting an if condition or a for condition in the HTML file.

3. The computer-implemented method of claim 1, wherein the observer is a mutation observer.

4. The computer-implemented method of claim 1, wherein the dynamic element is identified during an initialization phase of the HTML file.

5. The computer-implemented method of claim 1, wherein the signal sent by the observer is detected during run-time of the HTML file.

6. The computer-implemented method of claim 1, wherein generating a unique automation tag for an element corresponding to the change to the dynamic element comprises:
determining that there is a child element corresponding to the dynamic element; and
generating the unique automation tag for the child element.

7. The computer-implemented method of claim 6, wherein the unique automation tag for the child element is generated based on a unique automation tag for the dynamic element.

8. The computer-implemented method of claim 1, further comprising:
generating a test automation script using generated unique automation tags.

9. The computer-implemented method of claim 1, wherein after generating the unique automation tag for the element corresponding to the change to the dynamic element, the computer-implemented method further comprises:
adding the unique automation tag for the element to the HTML, file.

10. The computer-implemented method of claim 1, wherein after generating the unique automation tag for the element, the computer-implemented method further comprises:
adding the unique automation tag for the element to the HTML file.

11. A system comprising:
a memory that stores instructions; and
one or more processors configured by the instructions to perform operations comprising:
analyzing an HTML, file to identify elements in the HTML, file to which to add unique automation tags;
for each element identified, determining whether the element is a dynamic element;
based on determining that the element is a dynamic element, performing operations comprising:
generating an observer for the dynamic element to detect a change to the dynamic element;
detecting a signal sent by the observer indicating that a change to the dynamic element has occurred; and
generating a unique automation tag for an element corresponding to the change to the dynamic element; and
based on determining that the element is not a dynamic element, generating a unique automation tag for the element.

12. The system of claim 11, wherein the dynamic element is identified by detecting an if condition or a for condition in the HTML file.

13. The system of claim 11, wherein the observer is a mutation observer.

14. The system of claim 11, wherein the dynamic element is identified during an initialization phase of the HTML file.

15. The system of claim 11, wherein the signal sent by the observer is detected during run-time of the HTML file.

16. The system of claim 11, wherein generating a unique automation tag for an element corresponding to the change to the dynamic element comprises:

determining that there is a child element corresponding to the dynamic element; and generating the unique automation tag for the child element.

17. The system of claim 16, wherein the unique automation tag for the child element is generated based on a unique automation tag for the dynamic element.

18. The system of claim 11, the operations further comprising:

generating a test automation script using generated unique automation tags.

19. The system of claim 11, wherein after generating the unique automation tag for the element corresponding to the change to the dynamic element, or after generating the unique automation tag for the element, the operations further comprise:

adding the unique automation tag for the element to the HTML, file.

20. A non-transitory computer-readable medium comprising instructions stored thereon that are executable by at least one processor to cause a computing device to perform operations comprising:

analyzing an HTML file to identify elements in the HTML file to which to add unique automation tags;

for each element identified, determining whether the element is a dynamic element;

based on determining that the element is a dynamic element, performing operations comprising:

generating an observer for the dynamic element to detect a change to the dynamic element;

detecting a signal sent by the observer indicating that a change to the dynamic element has occurred; and generating a unique automation tag for an element corresponding to the change to the dynamic element; and based on determining that the element is not a dynamic element, generating a unique automation tag for the element.

* * * * *